(12) United States Patent
Schroers et al.

(10) Patent No.: US 11,335,034 B2
(45) Date of Patent: May 17, 2022

(54) SYSTEMS AND METHODS FOR IMAGE COMPRESSION AT MULTIPLE, DIFFERENT BITRATES

(71) Applicant: Disney Enterprises, Inc., Burbank, CA (US)

(72) Inventors: Christopher Schroers, Zurich (CH); Erika Doggett, Los Angeles, CA (US); Stephan Marcel Mandt, Santa Monica, CA (US); Jared McPhillen, Glendale, CA (US); Scott Labrozzi, Cary, NC (US); Romann Weber, Zurich (CH); Mauro Bamert, Nafels (CH)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 16/249,861

(22) Filed: Jan. 16, 2019

(65) Prior Publication Data

US 2020/0226797 A1 Jul. 16, 2020

(51) Int. Cl.
*G06T 9/20* (2006.01)
*G06T 9/00* (2006.01)

(52) U.S. Cl.
CPC ............... *G06T 9/20* (2013.01); *G06T 9/002* (2013.01)

(58) Field of Classification Search
CPC ............................ H04N 19/107; G06K 9/6256
USPC .................. 382/103, 173; 702/188; 345/2.3; 348/159
See application file for complete search history.

(56) References Cited

U.S. PATENT DOCUMENTS

| | | | |
|---|---|---|---|
| 2011/0286521 A1 | 11/2011 | Amonou et al. | |
| 2018/0176570 A1* | 6/2018 | Rippel | G06K 9/6212 |
| 2018/0176578 A1* | 6/2018 | Rippel | H04N 19/91 |
| 2019/0333190 A1 | 10/2019 | Schroers et al. | |
| 2020/0250539 A1* | 8/2020 | Liu | G06N 3/0481 |

FOREIGN PATENT DOCUMENTS

| KR | 10-2009-0006079 A | 1/2009 |
|---|---|---|
| KR | 10-2009-0100402 A | 9/2009 |

OTHER PUBLICATIONS

Extended European Search Report for application No. 20152309.9 dated Jun. 9, 2020.
Chen et al., "Learning for Video Compression", XP081014941, DOI: 10.1109/TCSVT.2019.2892608, Jan. 9, 2019, IEEE, 2018, pp. 1-11.
Han et al., "Deep Probabilistic Video Compression", arxiv:1810.02845v1, Oct. 5, 2018, XP080930310, 2018, pp. 1-14.
(Continued)

*Primary Examiner* — Kiet M Doan
(74) *Attorney, Agent, or Firm* — Artegis Law Group, LLP

(57) ABSTRACT

Systems and methods for predicting a target set of pixels are disclosed. In one embodiment, a method may include obtaining target content. The target content may include a target set of pixels to be predicted. The method may also include convolving the target set of pixels to generate an estimated set of pixels. The method may include matching a second set of pixels in the target content to the target set of pixels. The second set of pixels may be within a distance from the target set of pixels. The method may include refining the estimated set of pixels to generate a refined set of pixels using a second set of pixels in the target content.

12 Claims, 7 Drawing Sheets

(56) References Cited

OTHER PUBLICATIONS

Balle et al., "Variational Image Compression With a Scale Hyperprior", ICLR 2018, XP055632204, URL:https://arxiv.org/pdf/1802.01436.pdf, May 1, 2018. pp. 1-23.
Sulun, Serkan, "Deep Learned Frame Prediction for Video Compression", XP080939438, arxiv:1811.10946v1, Nov. 22, 2018, 71 pages.
Djelouah et al., "Neural Inter-Frame Compression for Video Coding", 2019 IEEE/CVF International Conference on Computer Vision (ICCV), IEEE, DOI: 10.1109/ICCV.2019.00652, XP033723542, 2019, pp. 6420-6428.

\* cited by examiner

SYSTEMS AND METHODS FOR IMAGE COMPRESSION AT MULTIPLE, DIFFERENT BITRATES

TECHNICAL FIELD

The present disclosure relates generally to image compression.

BRIEF SUMMARY OF THE DISCLOSURE

Embodiments of the disclosure are directed to systems and methods for predicting a target set of pixels.

In one embodiment, a computer-implemented method may be implemented in a computer system that includes non-transient electronic storage and one or more physical computer processors. The computer-implemented method may include obtaining, from the non-transient electronic storage, target content that includes the target set of pixels to be predicted. The computer-implemented method may include convolving, with the one or more physical computer processors, the target set of pixels to generate an estimated set of pixels. The computer-implemented method may include matching, with the one or more physical computer processors, a second set of pixels in the target content to the target set of pixels. The second set of pixels is within a distance from the target set of pixels. The computer-implemented method may include refining, with the one or more physical computer processors, the estimated set of pixels to generate a refined set of pixels using a second set of pixels in the target content.

In embodiments, the computer-implemented method may further include generating, with the one or more physical computer processors, a residual between the refined set of pixels and the target set of pixels.

In embodiments, refining the estimated set of pixels may include encoding, with the one or more physical computer processors, the estimated set of pixels and the second set of pixels. Refining the estimated set of pixels may include generating, with the one or more physical computer processors, a refined set of pixels by applying a decoder to an encoded estimated set of pixels and an encoded second set of pixels.

In embodiments, matching the second set of pixels to the target set of pixels may include applying, with the one or more physical computer processors, a convolution to the target set of pixels to generate displacement data corresponding to displacement from the target set of pixels to the second set of pixels.

In embodiments, convolving the target set of pixels may further include generating, with the one or more physical computer processors, corresponding weights for individual pixels of the estimated set of pixels.

In embodiments, supplemental information may be concatenated to the target set of pixels. The supplemental information may include one or more of a mask applied over the target set of pixels, color values of the target set of pixels, and contours in the target set of pixels.

In embodiments, refining the estimated set of pixels to generate a refined set of pixels comprises placing the second set of pixels in the position of the estimated set of pixels.

In embodiments, the distance from the target set of pixels to the second set of pixels is based on generating less than 16 bits of corresponding displacement data.

In another embodiment, a computer-implemented method for encoding target content may be implemented in a computer system that includes non-transient electronic storage and one or more physical computer processors. The computer-implemented method may include obtaining, from the non-transient electronic storage, target content and a corresponding quantization step size. The computer-implemented method may include obtaining, from the non-transient electronic storage, a trained compression model. The trained compression model may be conditioned by training an initial compression model using training data. The training data may include (i) multiple, different quantization step sizes corresponding to training content and (ii) reconstruction losses based on differences between individual training content and corresponding quantized training content using a given quantization step size. The computer-implemented method may include applying, with the one or more physical computer processors, the trained compression model to the encoded target content to generate compressed target content.

In embodiments, applying the trained compression model may include encoding, with the one or more physical computer processors, the target content. Applying the trained compression model may also include quantizing, with the one or more physical computer processors, the target content using the corresponding quantization step size. Applying the trained compression model may include applying, with the one or more physical computer processors, a bottleneck to quantized target content to generate decodable target content. Applying the trained compression model may also include decoding, with the one or more physical computer processors, the decodable target content to generate compressed target content.

In embodiments, applying the bottleneck to quantized target content may include modifying the quantized target content such that $$\tilde{y} = y + U\left(-\frac{1}{2}, \frac{1}{2}\right) \cdot s$$

where $\tilde{y}$ represents the decodable target content, y represents the target content, $U$ represents uniform noise, and s represents the corresponding quantization step size.

In embodiments, training the initial quantization model may include applying, with the one or more physical computer processors, a first subset of the training content using a first quantization step size. Training the initial quantization model may also include applying, with the one or more physical computer processors, a second subset of the training content using a first quantization step size and a second quantization step size. Training the initial quantization model may include repeating, with the one or more physical computer processors, one or more of the above steps by adding additional quantization step sizes until a maximum quantization step size is reached.

In embodiments, the corresponding quantization step size may be concatenated with the target content in order to apply the trained compression model.

In embodiments, the target content may include one or more of an image, a video frame, and a residual corresponding to the target content.

In embodiments, quantizing the target content may be defined by $$Q(y, x) = \text{round}\left(\frac{y}{s}\right)$$

where γ represents the encoded target content, s represents a corresponding quantization step size, and round(•) represents a rounding function that maps values to a closest integer.

In embodiments, the reconstruction losses may be defined by $$\mathcal{L}_{(x,x')} = \mathcal{R}_{(x,x')} + \gamma \cdot \varepsilon(\tilde{y})$$

where $\mathcal{L}(\bullet,\bullet)$ represents a rate-distortion loss value, $\mathcal{R}(\bullet,\bullet)$ represents a reconstruction loss value based on given target content and corresponding quantized target content, γ represents a weight, ε(•) represents an entropy value, and $\tilde{y}$ represents the quantized target content.

In one embodiment, a computer-implemented method for training a quantization model that improves quantization of target content may be implemented in a computer system. The computer system may include one or more physical computer processors and non-transitory electronic storage. The computer-implemented method may include obtaining, from the non-transient electronic storage, training data, the training data including (i) multiple, different quantization step sizes corresponding to individual target content and (ii) reconstruction losses based on differences between the individual target content and corresponding quantized target content using a given quantization step size. The computer-implemented method may include obtaining, from the non-transient electronic storage, an initial quantization model. The computer-implemented method may include generating a trained quantization model by training, on the one or more physical computer processors using the training data, the initial quantization model. The computer-implemented method may include storing, in the non-transient electronic storage, the trained quantization model in the electronic storage.

In embodiments, the computer-implemented method may further include obtaining, from the non-transient electronic storage, target content and a corresponding quantization step size. In embodiments, the computer-implemented method may include applying, with the one or more physical computer processors, the trained quantization model to the target content and the corresponding quantization step size to generate compressed target content.

In embodiments, applying the trained compression model may include encoding, with the one or more physical computer processors, the target content. Applying the trained compression model may include quantizing, with the one or more physical computer processors, the target content using the corresponding quantization step size. Applying the trained compression model may also include applying, with the one or more physical computer processors, a bottleneck to quantized target content to generate decodable target content. Applying the trained compression model may include decoding, with the one or more physical computer processors, the decodable target content to generate compressed target content.

In embodiments, applying the bottleneck to quantized target content may include applying, with the one or more physical computer processors, the corresponding quantization step size to quantized target content to generate decodable target content.

In embodiments, the corresponding quantization step size may be concatenated with the target content.

In embodiments, the computer-implemented method may further include encoding, with the one or more physical computer processors, a residual corresponding to the target content.

In one embodiment, a computer-implemented method for compressing target content may be implemented in a computer system that comprises non-transient electronic storage and one or more physical computer processors. The computer-implemented method may include obtaining, from the non-transient electronic storage, target content and a corresponding quantization step size. The computer-implemented method may include obtaining, from the non-transient electronic storage, a trained compression model. The trained compression model may be conditioned by training an initial compression model using training data. The training data may include (i) multiple, different quantization step sizes corresponding to training content and (ii) reconstruction losses based on differences between an individual training content and corresponding quantized training content using a given quantization step size. The computer-implemented method may include applying, with the one or more physical computer processors, the trained compression model to the target content to generate quantized target content. The trained compression model may encode the target content and the corresponding quantization step size. The trained compression model may quantize encoded target content. The trained compression model may prepare quantized target content for decoding. The trained compression model may decode the decodable target content to generate compressed target content.

Other features and aspects of the disclosed technology will become apparent from the following detailed description, taken in conjunction with the accompanying drawings, which illustrate, by way of example, the features in accordance with embodiments of the disclosure. The summary is not intended to limit the scope of the claimed disclosure, which is defined solely by the claims attached hereto.

BRIEF DESCRIPTION OF THE DRAWINGS

Further aspects of the present disclosure will be more readily appreciated upon review of the detailed description of the various disclosed embodiments, described below, when taken in conjunction with the accompanying figures.

The figures are described in greater detail in the description and examples below, are provided for purposes of illustration only, and merely depict typical or example embodiments of the disclosure. The figures are not intended to be exhaustive or to limit the disclosure to the precise form disclosed. It should also be understood that the disclosure may be practiced with modification or alteration, and that the disclosure may be limited only by the claims and the equivalents thereof.

DETAILED DESCRIPTION

Various embodiments of the present disclosure are directed to a method or system for estimating a target set of pixels and compressing target content at multiple, different bitrates. Target content may include different types of media content, such as, for example, videos and images. Content may come in various resolutions, such as standard, high definition (HD), ultra HD (UHD), 4 k UHD, 8 k UHD, and/or other resolutions. Estimating the target set of pixels may include using a prediction model. The prediction model may use an encoder to generate a rough estimate of the set of pixels. A nearby set of pixels in the target content may be matched to the target set of pixels based on one or more features. The rough estimate and the matching set of pixels may be encoded and combined. The combination of encoded data may be decoded to generate a refined set of pixels. The refined set of pixels may be used to generate a residual between the refined set of pixels and the original, target set of pixels. In embodiments, the residual may be applied through a compression model using encoders, quantizers, bottlenecks, and decoders. The compression model may be able to handle multiple, different bitrates because it is trained using multiple, different quantization step sizes that may steer the compression rate. The training may incorporate multiple, different quantization step sizes until a maximum quantization step size is reached. The training may use individual quantization step sizes with corresponding outputs to improve future outputs for a given quantization step size. In some embodiments, a distortion removal model may be applied to the compressed target content to remove any distortions and/or artifacts. The distortion removal model may be able to handle multiple, different quality levels.

Figure 1:
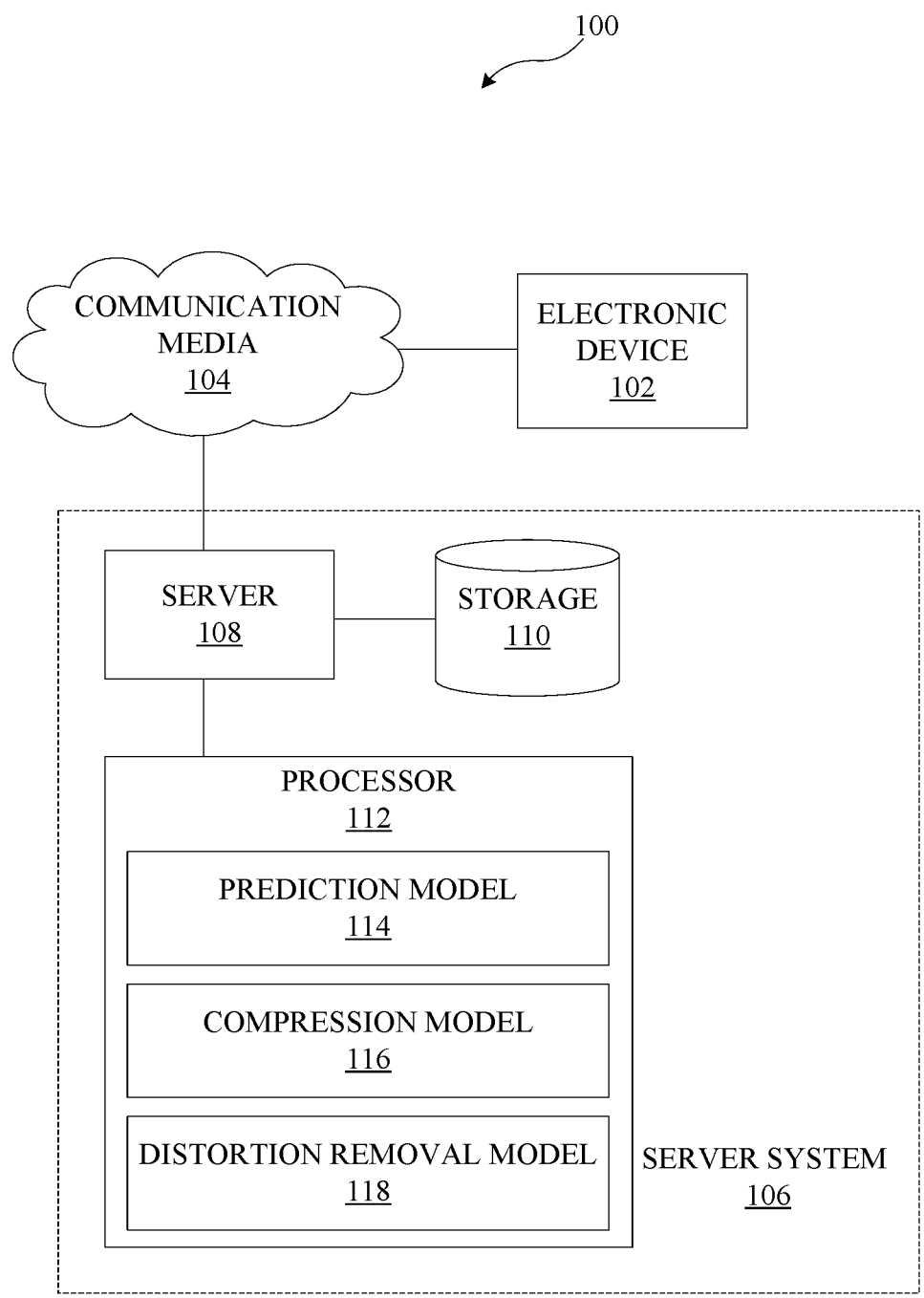
FIG. 1 illustrates an example system for compressing target content with multiple, different bitrates, in accordance with various embodiments.

Before describing the technology in detail, it may be useful to describe an example environment in which the presently disclosed technology can be implemented. FIG. 1 illustrates one such example environment 100.

Environment 100 may be used in connection with implementing embodiments of the disclosed systems, methods, and devices. By way of example, the various below-described components of FIG. 1 may be used to predict a target set of pixels in target content, compress the target content using a compression model able to handle multiple, different bitrates, and remove any distortion and/or artifacts from reconstructed target content. Target content may include images, video, data, and/or other content. Target content may include a quantization step size, one or more pixels to be predicted, and/or other information. Reconstructed content may be derived from content that has been compressed, modified, altered, and/or otherwise distorted. Reconstructed content may include distortion, artifacts and/or other modifications that result from the above compression, modification, alteration, and/or other distortions to the target content. Server system 106 may include prediction model 114, compression model 116, and distortion removal model 118, as will be described herein. Prediction model 114 may estimate the set of pixels in the target content, compression model 116 may be able to handle multiple, different bitrates to compress the target content, and distortion removal model 118 may generate corrected content to be sent to/from electronic device 102.

Prediction model 114 may estimate a target set of pixels in the target content. In embodiments, the target set of pixels may be selected based on surrounding pixels in the target content, surrounding content (e.g., nearby frames in video content), etc. In one example, a 64×64 target set of pixels may be predicted from a 320×320 image. It should be appreciated that other sizes and shapes of the target set of pixels may be estimated from different sized images. In some embodiments, the target set of pixels may be masked before applying prediction model 114. The mask may filter the target set of pixels using one or more of a box filter, a weighted average filter, and/or other filter. In some embodiments, the mask may extract the target set of pixels for prediction model 114. In embodiments, prediction model 114 may use machine learning (e.g., a neural network and/or other machine learning algorithms) to improve predictions.

Compression model 116 may compress target content using multiple, different bitrates. In some embodiments, compression model 116 may be an initial compression model. The initial compression model may be trained in server system 106 using training data obtained from storage 110. Training may be incremental (e.g., training on a first subset of target content using a first quantization step size, then training on a second subset of target content using the first quantization step size and the second quantization step size, etc.). The initial compression model may use machine learning (e.g., a neural network and/or other machine learning algorithms) to train compression model 116 and improve the output of compression model 116. The resulting trained compression model may be stored in storage 110. The trained compression model may be able to code multiple, different bitrates.

Distortion removal model 118 may generate corrected content. An example distortion removal model is described in greater detail in U.S. patent application Ser. No. 16/167,388, which is incorporated by reference in its entirety herein. Distortion removal model 118 may be able to handle multiple, different quality levels for target content. In embodiments, an initial distortion removal model may be trained on one or more training quality levels in server system 106 to generate a trained distortion removal model. The training content may include target content and corresponding training quality levels. The corresponding training quality levels may include multiple, different quality levels. The trained distortion removal model may be applied to target content with one or more target quality levels to generate corrected content. In some embodiments, the one or more target quality levels may have different values than the training quality levels.

One or more of prediction model 114, compression model 116, and distortion removal model 118 may be used in an end-to-end pipeline where, for example, multiple target content with multiple sets of pixels are estimated to generate multiple residuals representing the target content, the residuals are compressed using multiple, different bitrates, and any artifacts and/or distortions are removed from the compressed residuals using multiple, different quality levels.

Electronic device 102 may include a variety of electronic computing devices, such as, for example, a smartphone, tablet, laptop, computer, wearable device, television, virtual reality device, augmented reality device, displays, connected home device, Internet of Things (IOT) device, smart speaker, and/or other devices. Electronic device 102 may present content to a user and/or receive requests to send content to another user. In some embodiments, electronic device 102 may apply prediction model 114, compression model 116, and distortion removal model 118 to target content. In embodiments, electronic device 102 may store prediction model 114, compression model 116, and distortion removal model 118.

As shown in FIG. 1, environment 100 may include one or more of electronic device 102 and server system 106. Electronic device 102 can be coupled to server system 106 via communication media 104. As will be described in detail herein, electronic device 102 and/or server system 106 may exchange communications signals, including content, metadata, quality levels, quantization step sizes, user input, side information, and/or other information via communication media 104.

In various embodiments, communication media 104 may be based on one or more wireless communication protocols such as Wi-Fi, Bluetooth®, ZigBee, 802.11 protocols, Infrared (IR), Radio Frequency (RF), 2G, 3G, 4G, 5G, etc., and/or wired protocols and media. media 104 may be implemented as a single medium in some cases.

As mentioned above, communication media 104 may be used to connect or communicatively couple electronic device 102 and/or server system 106 to one another or to a network, and communication media 104 may be implemented in a variety of forms. For example, communication media 104 may include an Internet connection, such as a local area network (LAN), a wide area network (WAN), a fiber optic network, internet over power lines, a hard-wired connection (e.g., a bus), and the like, or any other kind of network connection. Communication media 104 may be implemented using any combination of routers, cables, modems, switches, fiber optics, wires, radio (e.g., microwave/RF links), and the like. Upon reading the present disclosure, it should be appreciated that other ways may be used to implement communication media 104 for communications purposes.

Likewise, it will be appreciated that a similar communication medium may be used to connect or communicatively couple server 108, storage 110, processor 112, prediction model 114, compression model 116, and/or distortion removal model 118 to one another in addition to other elements of environment 100. In example implementations, communication media 104 may be or include a wired or wireless wide area network (e.g., cellular, fiber, and/or circuit-switched connection, etc.) for electronic device 102 and/or server system 106, which may be relatively geographically disparate; and in some cases, aspects of communication media 104 may involve a wired or wireless local area network (e.g., Wi-Fi, Bluetooth, unlicensed wireless connection, USB, HDMI, standard AV, etc.), which may be used to communicatively couple aspects of environment 100 that may be relatively close geographically.

Server system 106 may provide, receive, collect, or monitor information to/from electronic device 102, such as, for example, content, metadata, quantization step sizes, quality levels, user input, security and encryption information, side information, and the like. Server system 106 may be configured to receive or send such information via communication media 104. This information may be stored in storage 110 and may be processed using processor 112. For example, processor 112 may include an analytics engine capable of performing analytics on information that server system 106 has collected, received, etc. from electronic device 102. Processor 112 may include prediction model 114, compression model 116, and distortion removal model 118 capable of receiving target content, analyzing target content, and otherwise processing content and generating corrected content that server system 106 has collected, received, etc. based on requests from, or coming from, electronic device 102. In embodiments, server 108, storage 110, and processor 112 may be implemented as a distributed computing network, a relational database, or the like.

Server 108 may include, for example, an Internet server, a router, a desktop or laptop computer, a smartphone, a tablet, a processor, a component, or the like, and may be implemented in various forms, including, for example, in an integrated circuit or collection thereof, in a printed circuit board or collection thereof, or in a discrete housing/package/rack or multiple of the same. Server 108 may update information stored on electronic device 102. Server 108 may send/receive information to/from electronic device 102 in real-time or sporadically. Further, server 108 may implement cloud computing capabilities for electronic device 102. Upon studying the present disclosure, one of skill in the art will appreciate that environment 100 may include multiple electronic devices 102, communication media 104, server systems 106, servers 108, storage 110, processors 112, prediction model 114, compression model 116, and/or distortion removal model components 118.

Figure 2:
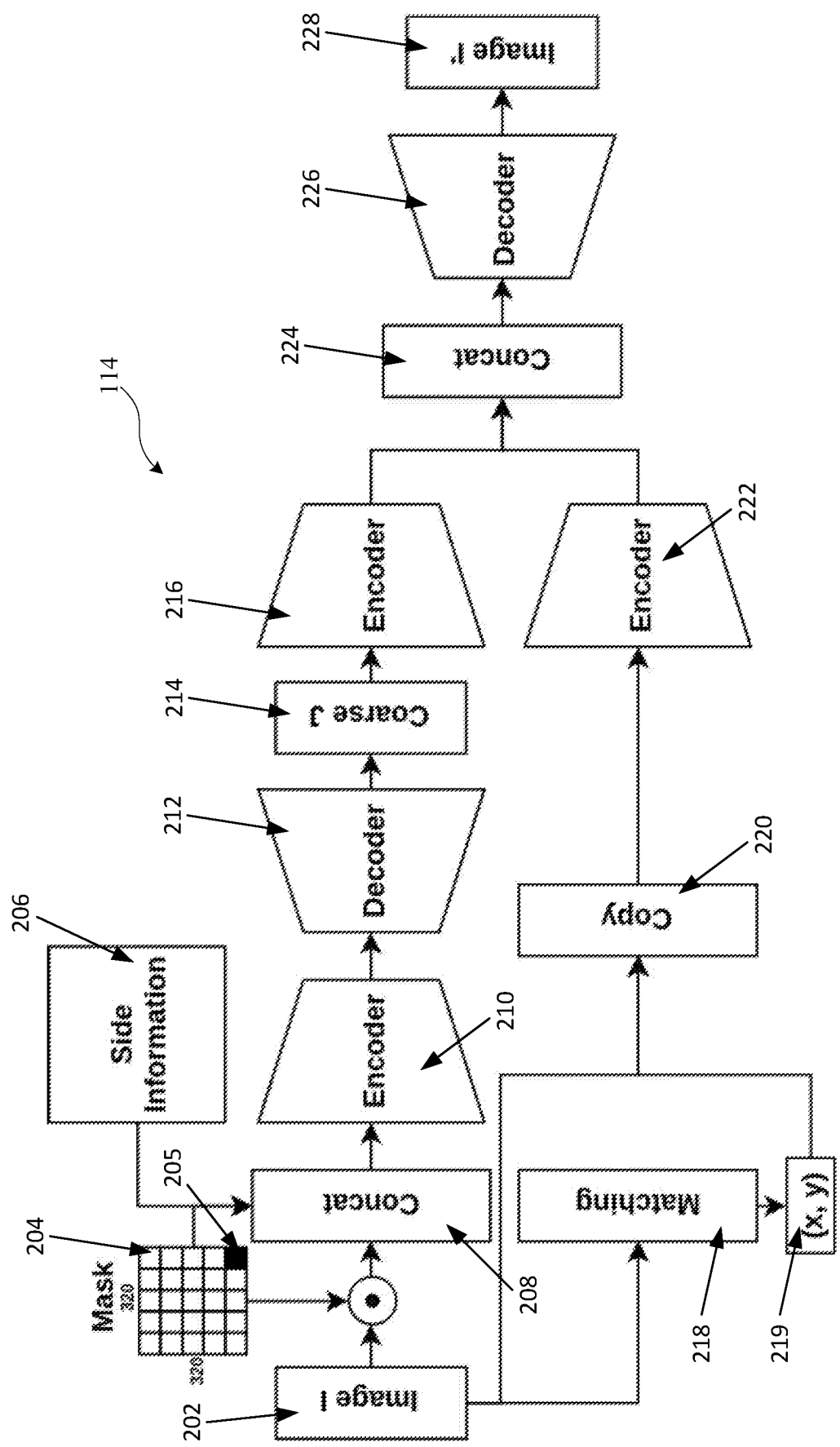
FIG. 2 illustrates an example prediction model, in accordance with embodiments of the disclosed technology.

FIG. 2 illustrates an example prediction model, in accordance with various embodiments of the present disclosure. As illustrated, prediction model 114 may include one or more encoders 210, 216, and 222 and corresponding decoders 212 and 226, matching component 218 to select a matching set of pixels for the target set of pixels, displacement component 220 to use displacement data to move the matching set of pixels to the position of the target set of pixels, and/or other components. In embodiments, prediction model 114 may predict a target set of pixels per individual sets of pixels, where the individual sets of pixels can be sequentially processed (e.g., raster-scan order and/or other orders) when encoding the target content. Sets of pixels that have already been processed (e.g., encoded and/or decoded) may be used to encode the target set of pixels.

Input to prediction model 114 may include target content (e.g., an image including a target set of pixels to be predicted) and/or side information 206 (e.g., one or more masks 204, one or more color values, one or more contours in the target content, etc.). In embodiments, multiple inputs may be concatenated at 208.

In embodiments, encoder 210 and decoder 212 may be an auto-encoder model that uses gated convolutions. The gated convolution may be defined by $$G_I = \text{Conv2D}_G(I) F_I = \text{Conv2D}_F(I) O = \Gamma(F_I) \cdot \sigma(G_I)$$

where O represents the output of the gated convolution, Conv2D represents a two dimensional convolution, $\sigma(\bullet)$ represents the sigmoid activation function, and $\Gamma(\bullet)$ represents an activation function (e.g., RELU, tan h, and/or other activation functions). The output, O, may correspond to weights for the convolution, $F_I$. The weight may be used by prediction model 114 to use the weighting to propagate the mask through prediction model 114 such that more importance may be put on available pixel values. It should be appreciated that different convolutions may be used for different applications.

In some embodiments, the convolution may generate and/or pass through side information, such as sampled color values, contours, and/or other side information to improve the compressible output of the convolution. In some embodiments, the side information may be weighted based on impact to the target set of pixels. In embodiments, by training compression model 116, improved side information may be generated to improve compressible output of prediction model 114.

In embodiments, the weights may be used to train prediction model 114. The training data may include a given weight based on a position of available pixels, the target set of pixels, the estimated set of pixels, and the refined set of pixels. The training may generate a trained prediction model. The training may use training content with one or more weights. The estimated set of pixels and the refined set of pixels for the training content may be compared to the training set of pixels for a given weight based on a position of available pixels. The components may be adjusted to improve the accuracy and precision of the estimated set of pixels and the refined set of pixels; thereby, generating a trained prediction model 114.

Encoder 210 and decoder 212 may generate estimated set of pixels 214 corresponding to the target set of pixels.

Target content 202 may also be used to match a target set of pixels 205 to a matching set of pixels. The matching set of pixels may come from the target content, nearby frames (i.e., if the content is video), and/or other sources. In embodiments, the matching set of pixels may be taken from a set of pixels nearby the target set of pixels. Selecting a matching set of pixels may be based on one or more of a resulting number of displacement data (e.g., no more than 16 bits are used to encode displacement data, or 8 bits per dimensional displacement in 2D), a distance away from an edge of the target set of pixels, a similarity between color values (e.g., color value is within a range), a similarity between objects (e.g., object/shape recognition), and/or other criteria. It should be appreciated that different bitrates, ranges, and/or thresholds may be used to select a matching set of pixels. In embodiments, matching may be accomplished using a convolution. The convolution may use the target set of pixels as a "ground-truth" kernel and generate side information corresponding to displacement from the position of the matched set of pixels to the target set of pixels. In some embodiments, sub-pixel displacements may be quantized. It should be appreciated that other models, methods, and/or systems be used to help refine estimated set of pixels 214.

In embodiments, prediction model 114 may be trained by optimizing the following loss:

$$L_{pred}(I) = L_{1,spatial}(I,J) + L_1(I,I')$$

where I represents the input image, J represents the coarse output of the first prediction processing step, I' represents the final prediction output, $L_1(\cdot)$ represents the $L_1$ loss, and $L_{1,spatial}(\cdot)$ represents a weighted $L_1$ loss, as described below.

For the weighted $L_1$ loss, a weighting matrix may be generated through the distance of the current pixel to a given input pixel. The weight for a pixel may be given as:

$$w(p_{x,y}) = \gamma^l$$

where $(p_{x,y})$ represents the pixel at position (x,y), $\gamma$ may be set to 0.99, and l represents the distance to the next known pixel at decode time. It should be appreciated that different weights can be used to impact the effect the target set of pixels have on the loss and different values of $\gamma$ may be used.

Estimated set of pixels 214 and the matching set of pixels may be encoded in parallel. In embodiments, the resulting outputs of encoder 216 and 222 may be concatenated at 224. The concatenated pixels may be decoded by decoder 226 to generate a refined set of pixels to incorporate into refined target content. A residual may be generated based on differences between the refined set of pixels and the target set of pixels. The residual, the target content, and/or the target set of pixels may be used as input for compression model 116. In some embodiments, a generative adversarial network loss (e.g., LS-GAN and/or other kinds of GAN) may be used with prediction model 114.

Figure 3:
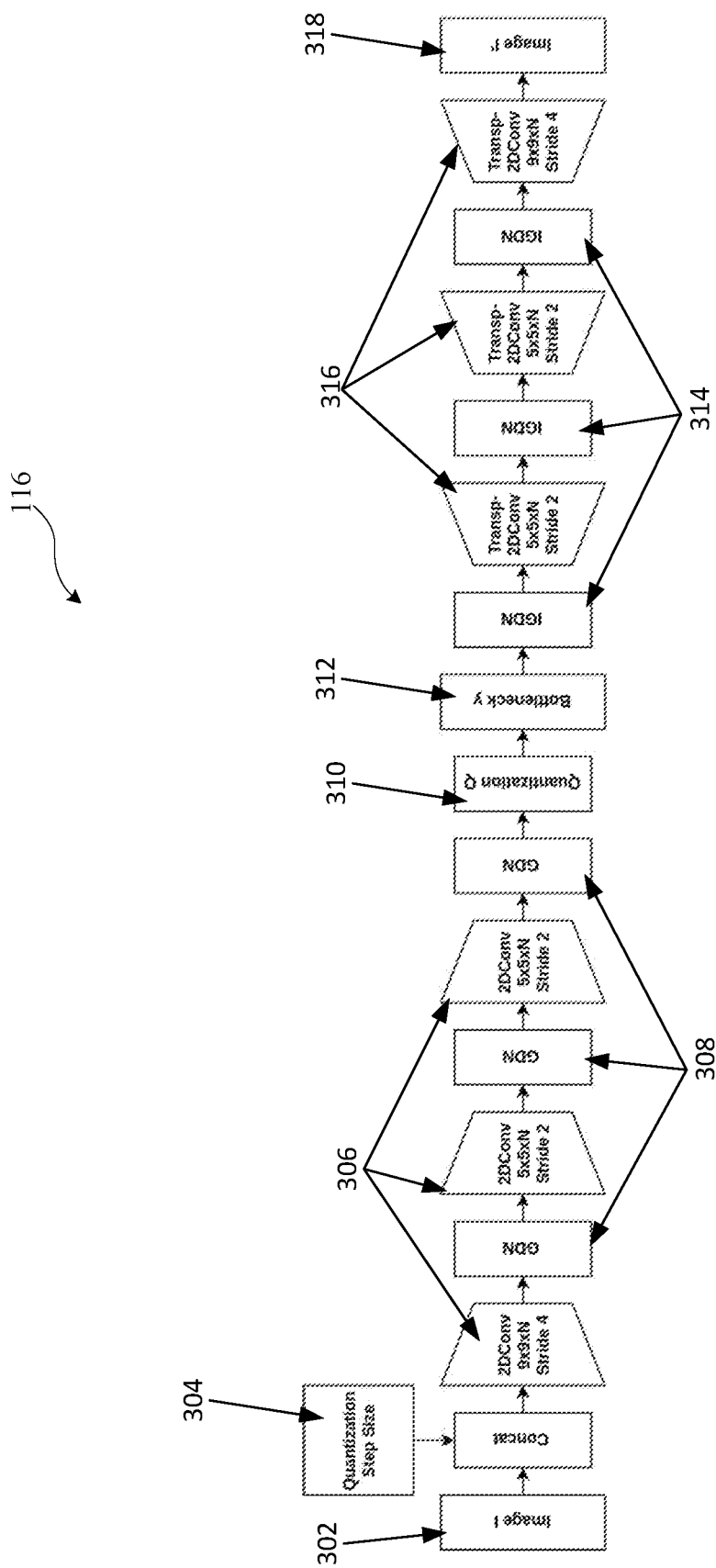
FIG. 3 illustrates an example compression model in accordance with embodiments of the disclosed technology.

FIG. 3 illustrates an example compression model, in accordance with various embodiments of the present disclosure. As illustrated, compression model 116 may include one or more encoding convolutions 306, encoding activation functions 308, quantization models 310, bottlenecks 312, decoding activation functions 314, decoding convolutions 316, and/or other components. In embodiments, compression model 116 may compress target content at multiple, different bitrates. As illustrated, encoding activation functions 308 and decoding activation functions 314 may, for example, be a GDN activation function. However, it should be appreciated that other activation functions may be used, such as, for example, ReLU, leaky ReLU, ELU, etc.

Input to compression model 116 may include target content 302 (e.g., an image, a frame of a video, a residual, and/or other content) and side information 304 (e.g., a quantization step size, a mask corresponding to the residual, a color sample, a contour, etc.). The quantization step size may be the difference between individual values corresponding to the target content (e.g., individual values are separated by 1 unit, 2 units, 3 units, etc.). Compression model 116 may be trained using training data. For example, compression model 116 may minimize the rate-distortion loss:

$$L(x,x') = R(x,x') + \gamma \cdot \varepsilon(\tilde{y})$$

where $R(\cdot,\cdot)$ represents the reconstruction loss, $\varepsilon(\cdot)$ represents the rate loss term (e.g., entropy), and $\tilde{y}$ represents the quantized bottleneck and weights the rate-distortion.

Reconstruction loss may be defined by a mean square error (MSE), an $L_1$ error, or a multiscale structural similarity (MS-SSIM). The rate term may be defined as $\varepsilon(\tilde{y}) = -\log P(\tilde{y})$. The probability function $P(\cdot)$ may be modeled as a piecewise linear function. The probability function may be trained with compression model 116 and pre-trained on the untrained $\tilde{y}$ bottleneck. A piecewise model may be fitted for each feature map, i, in the bottleneck, and the values at the discrete sample points may be given as $\phi_i$ with fitting error:

$$L_i(\phi_i) = \frac{1}{d}\sum_{l=0}^{2pd}\phi_i^2 - \frac{2}{n}\sum_{j=0}^{n}P_i(\tilde{y}, \phi_i)$$

where p represents the number of unit intervals in the positive half of the axis, d represents the number of sampling points per unit interval, and n represents the number of elements in the given feature map, i. The overall loss to optimize the piecewise linear function may be:

$$L_{plf}(\phi) = \sum_{i=0}^{m} L_i(\phi_i)$$

where m represents the number of feature maps in the bottleneck. It should be appreciated that other rate distortion losses may use different variables and functions (e.g., different reconstruction losses and probability models).

Different quantization step sizes, s, may be used to train compression model 116. The set $S = \{s_1, s_2, \ldots s_O\}$ defines the considered quantization step sizes where $s_i < s_{i+1}$ for all i. For each training data set, a quantization step size may be sampled uniformly at random from a subset $S' \subset S$. The first training data set may start with $S' = \{s_1\}$. The second training data set may include $s_2$ as well (e.g., S'={$s_1$ and $s_2$}). The training data sets may repeatedly increase after optimization losses reach a threshold value for each set until S'=S.

Since a larger quantization step size implies smaller entropy with more distortion, the rate-distortion loss may be scaled by the sampled quantization step size. Accordingly, the redefined rate-distortion loss is:

$$L(x,x')=R(x,x')+s_i\cdot\gamma\cdot\varepsilon(\tilde{y})$$

where $s_i$ represents the sampled quantization step size from S'.

In some embodiments, a generative adversarial network loss (e.g., LS-GAN and/or other kinds of GAN) may be used with compression model 116.

In embodiments, an Adam solver may be used to solve the rate-distortion loss. In some embodiments, a stochastic gradient descent (SGD) may be used to solve the probability model fitting. In embodiments, compression model 116 may be trained first and the distortion removal model 118 afterwards with the same set S for the relevant features.

As illustrated, encoding convolutions 306 may use a 9×9×N matrix with a stride of 4 and a 5×5×N matrix with a stride of 2, where N describes the number of features in bottleneck 312. It should be appreciated that different matrices and strides may be used. Moreover, while three convolutions are illustrated on both the encoding and decoding side, it should be appreciated that the number and type of convolutions may be different.

Quantization model 310 may be used to limit bits per element in bottleneck 312 by quantizing the values:

$$Q(y, s) = \text{round}\left(\frac{y}{s}\right)$$

where y represents the encoder output, s represents the quantization step size, and round(•) maps values to the closest integer. In some embodiments, the output of Q(y,s) may be losslessly entropy coded using an entropy coder (not shown) such as, for example, a binary arithmetic coder and/or a general purpose entropy coder (e.g., a PAQ). The compression rate may be steered by increasing or decreasing the quantization step size, s.

In embodiments, the quantization step size may be multiplied with the output of bottleneck 312:

$$\tilde{y}=Q(y,s)\cdot s$$

In some embodiments, uniform noise may be added and/or injected during training. Depending on the quantization step size, the uniform noise may be adapted such that:

$$\tilde{y}=y+U(-\tfrac{1}{2},\tfrac{1}{2})\cdot s$$

In embodiments, the quantization step sizes may be input to compression model 116. The input quantization step sizes may signal to encoding convolutions 306 which quantization will happen on its output and help compression model 116 produce a better representation for the used quantization step size. It should be appreciated that different methods may be used to input the quantization step size into compression model 116. For example, the used quantization step size may be concatenated as a fourth channel with the target content.

In some embodiments, distortion removal model 118 may be applied directly on final decoding convolution 316. In some embodiments, a generative adversarial network loss (e.g., LS-GAN and/or other kinds of GAN) may be used with distortion removal model 118.

Figure 4:
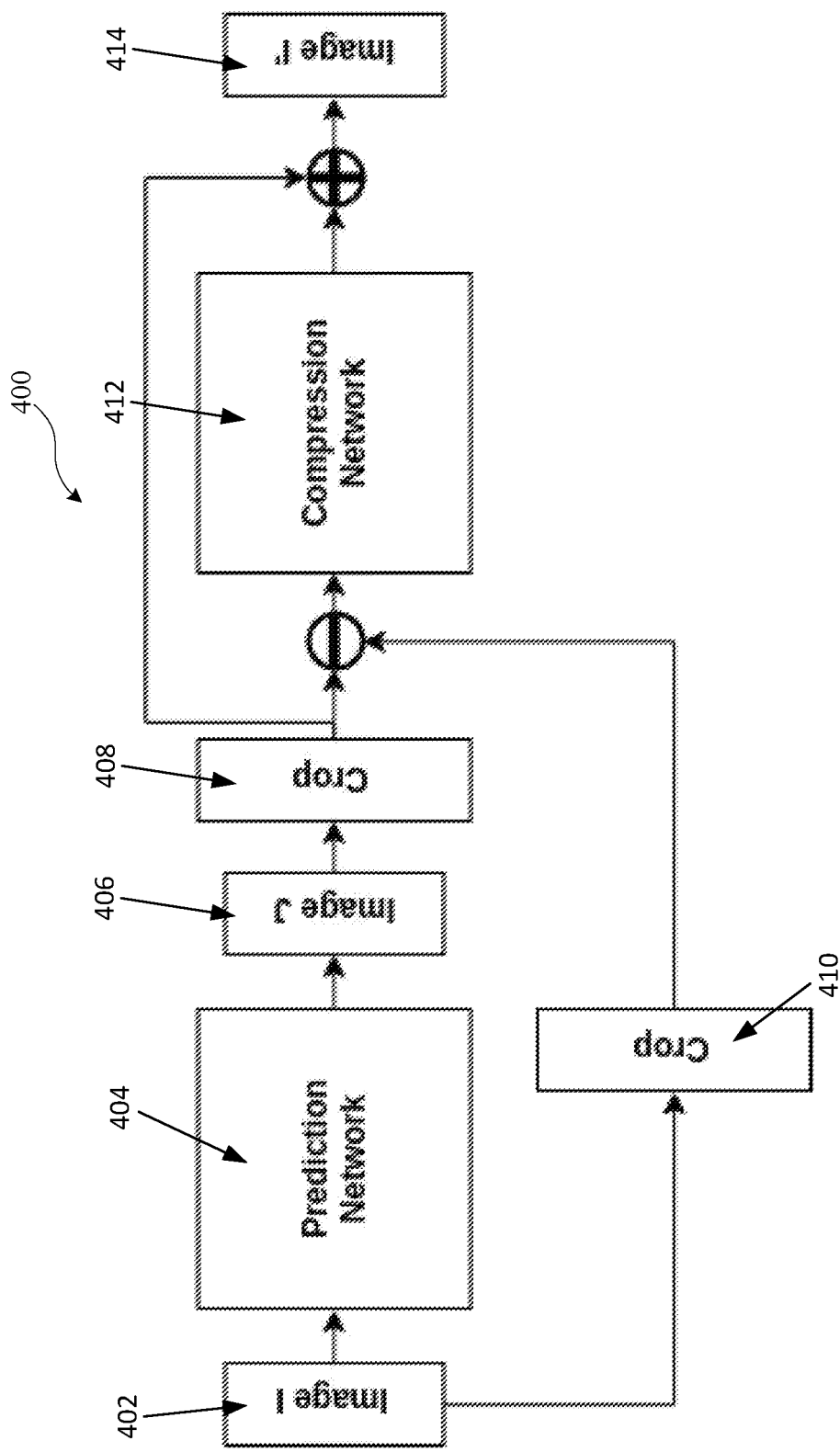
FIG. 4 illustrates an example model combining an example compression model and an example content prediction model, in accordance with embodiments of the disclosed technology.

FIG. 4 illustrates an example compression pipeline using prediction model 404 and compression model 412. This is one example of combining prediction with compression, and it should be appreciated that other features and/or components may be used. In embodiments, as described above, a distortion removal model may be applied after compression model 412 and may be trained separately. In some embodiments, prediction model 404, compression model 412, and distortion removal model (not shown) may be trained from end-to-end. In embodiments, the matching (e.g., matching component 218) in prediction model 404 may be conducted in the feature space after encoding the coarse and original image through an encoder (e.g., after encoder 216).

As illustrated, input target content and/or target set of pixels 402 may be input to prediction network 404 to generate refined set of pixels 406. In some embodiments, refined set of pixels 406 may be incorporated into refined target content 406. Refined set of pixels 406 may be larger than target set of pixels 402 and may be cropped to match target set of pixels 402 at 408. In some embodiments, target set of pixels 402 may be cropped at 410. Refined set of pixels 406 may be input to compression model 412 to generate compressed target content 414.

In embodiments, prediction model 114 and compression model 116 may be trained end-to-end, and the loss for pipeline 400 may be defined by:

$$L=L_{pred}(I)+L_1(I_{crop},I')+\gamma\cdot s_i\cdot\varepsilon(y)$$

where I represents the target content, $I_{crop}$ represents the input image cropped to the target set of pixels to be predicted, I' represents the compression reconstruction output, and y represents the bottleneck of compression model 116. The input I to pipeline 400 can have several forms in terms of number of pixels in the target set of pixels, the shape of the pixels, and/or other considerations. Those can be incorporated during training and/or after training.

In embodiments, side information may be trained using compression model 116, and a corresponding prediction loss may be given as:

$$L_{pred}(I)=L_{1,spatial}(I,J)+L_1(I,I')+\gamma\cdot s_i\cdot\varepsilon(y')$$

where y' represents the side information bottleneck.

In embodiments, an Adam solver may be used for optimization and may be trained on target content patches that may be randomly extracted from the training data. It should be appreciated that other solvers may be used for optimization.

Figure 5:
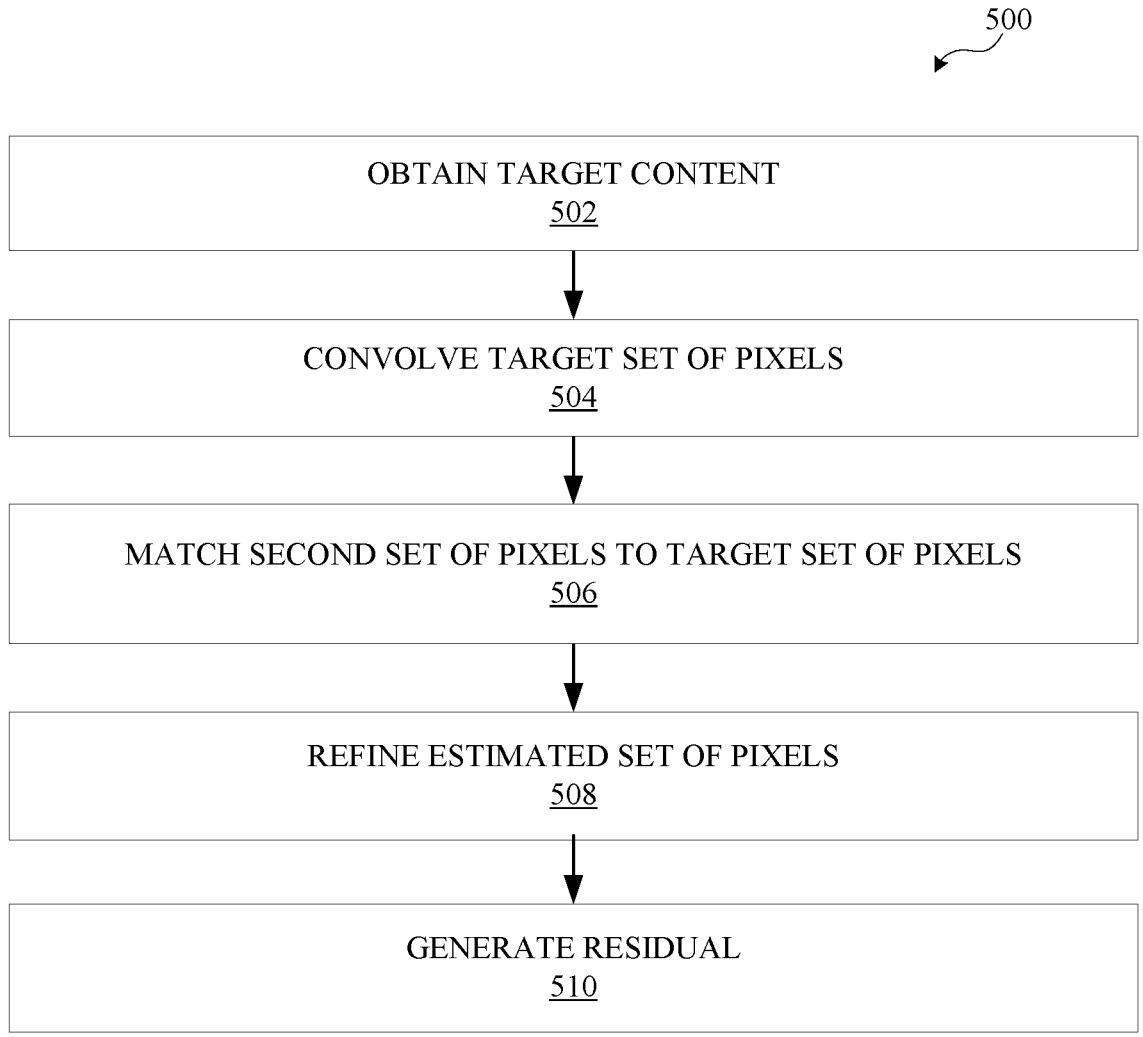
FIG. 5 is an operational flow diagram illustrating an example process for generating a residual from a refined set of pixels by applying the prediction model to the target content, in accordance with one embodiment.

FIG. 5 is an operational flow diagram illustrating an example process for generating a residual from a refined set of pixels by applying a prediction model to target content, in accordance with one embodiment. The operations of the various methods described herein are not necessarily limited to the order described or shown in the figures, and it should be appreciated, upon studying the present disclosure, that variations of the order of the operations described herein are within the spirit and scope of the disclosure.

The operations and sub-operations of the flow diagram may be carried out, in some cases, by one or more of the components, elements, devices, components, and circuitry of system 100. This may include one or more of: server system 106; server 108; processor 112; storage 110; and/or computing component 700, described herein and referenced with respect to at least FIGS. 1 and 7, as well as subcomponents, elements, devices, components, and circuitry depicted therein and/or described with respect thereto. In such instances, the description of the flow diagram may refer to a corresponding component, element, etc., but regardless of whether an explicit reference is made, it will be appreciated, upon studying the present disclosure, when the corresponding component, element, etc. may be used. Further, it will be appreciated that such references do not necessarily limit the described methods to the particular component, element, etc. referred to. Thus, it will be appreciated that aspects and features described above in connection with (sub-) components, elements, devices, circuitry, etc., including variations thereof, may be applied to the various operations described in connection with the flow diagram without departing from the scope of the present disclosure.

At operation 502, target content may be obtained. The target content may include an image, a video, and/or other media content. The target content may include multiple pixels. A target set of pixels from the multiple pixels may be selected for prediction. The target set of pixels may be selected based on similarity to other pixels in the target content (e.g., a similar shaped object, a similar set of color values, etc.), similarity to other pixels in nearby content (e.g., similar shaped object in previous or subsequent frames, similar set of color values in previous or subsequent frames, etc.), order of encoding/decoding (e.g., last set of pixels to be encoded/decoded to leverage earlier encoded/decoded pixels), and/or other criteria. The target set of pixels may be various shapes and sizes.

At operation 504, the target set of pixels may be convolved. In some embodiments, the convolution may be a gated convolution that is part of an auto-encoder model. Applying the convolution may generate an estimated set of pixels corresponding to the position of the target set of pixels. In embodiments, individual pixels of the target set of pixels may be weighted differently, as described above. In some embodiments, the convolution may generate and/or pass through side information. For example, side information may be concatenated with the target set of pixels as the target set of pixels is refined.

At operation 506, a second set of pixels may be matched to the target set of pixels. The second set of pixels may be a different size and shape than the target set of pixels. For example, the second set of pixels may be larger than the target set of pixels. The second set of pixels may be selected based on similarities to the target set of pixels and/or nearby content, as described above. In embodiments, the second set of pixels may be selected based on the resulting amount of displacement data, as described above.

At operation 508, an estimated set of pixels may be refined. The refined set of pixels may be generated by using the second set of pixels and the estimated set of pixels. For example, as described above, the second set of pixels may be encoded in parallel and concatenated. The concatenated sets of pixels may be applied to a decoder to generate a refined set of pixels. The second set of pixels may include side information corresponding to the displacement of the second set of pixels from the position of the target set of pixels.

At operation 510, the residual may be generated. The residual may be based on differences between the refined set of pixels and the target set of pixels.

Figure 6:
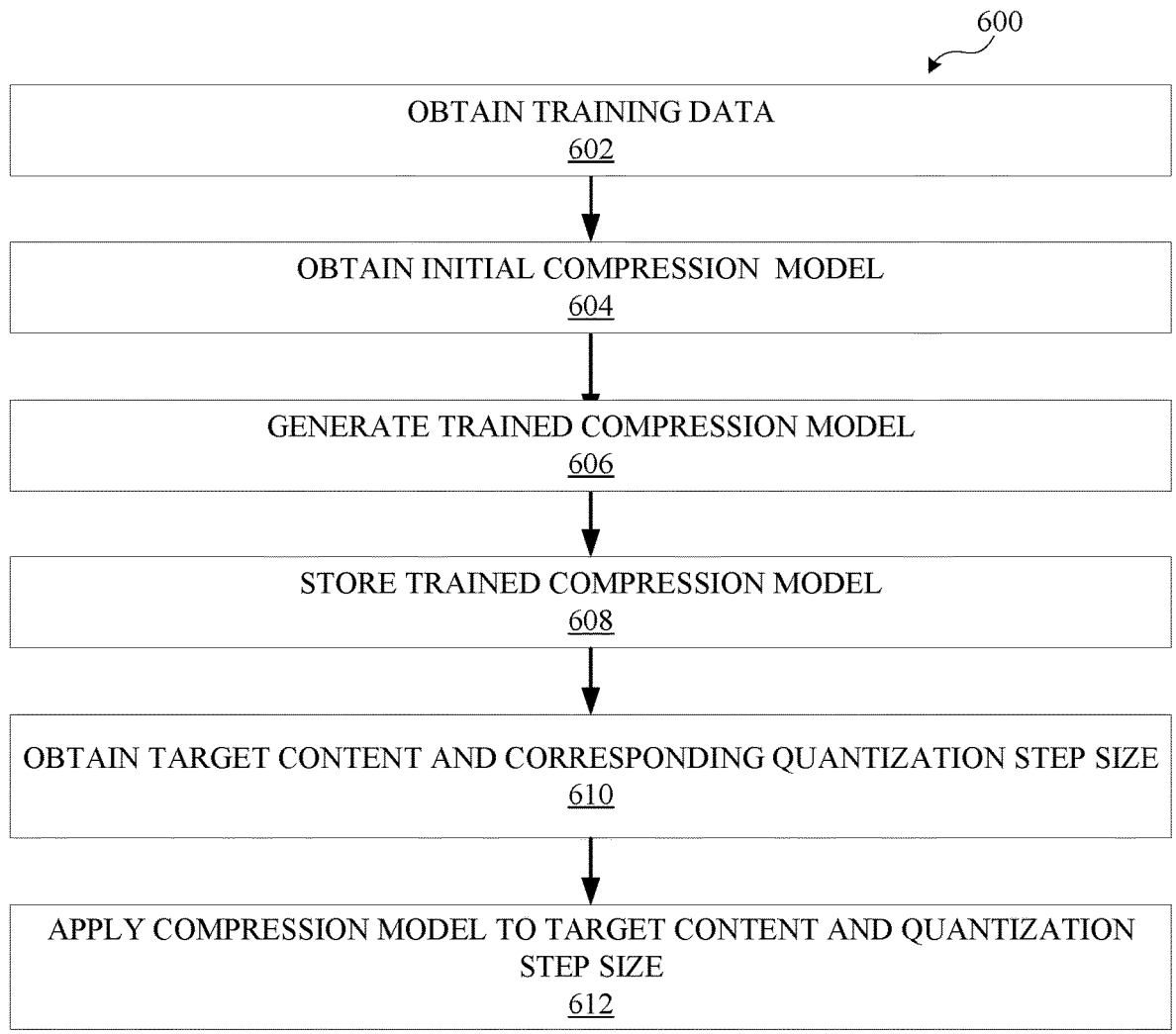
FIG. 6 is an operational flow diagram illustrating an example process for compressing target content using a trained compression model, in accordance with one embodiment.

FIG. 6 is an operational flow diagram illustrating an example process for compressing target content using a trained compression model, in accordance with one embodiment.

At operation 602, training data may be obtained. The training data may include multiple, different quantization step sizes corresponding to individual target content, and/or reconstruction losses based on differences between the individual target content and corresponding quantized target content using a given quantization step size. Reconstruction may be decoding target content. Reconstruction losses may refer to differences between target content (e.g., original content) and the decoded target content. In embodiments, reconstruction losses may include quantization step sizes corresponding to the target content.

At operation 604, the initial compression model may be obtained. The compression model may be similar to compression model 116, as described above (e.g., one or more encoders, one or more activation functions, one or more quantizers, one or more bottlenecks, and/or one or more decoders).

At operation 606, the trained compression model may be generated by training the initial compression model. Training may include using the corresponding reconstruction losses based on a given quantization step size to improve encoder and/or decoder performance. For example, the training data may be gradually introduced to include more quantization step sizes and larger quantization step sizes, as described above (e.g., start with a first quantization step size, use the first quantization step size and a second quantization step size, where the second quantization step size may be larger than the first quantization step size, etc.).

At operation 608, the trained compression model may be stored. In embodiments, the trained compression model may be stored in non-transient electronic storage.

At operation 610, target content and a corresponding quantization step size may be obtained.

At operation 612, the compression model may be applied to the target content and the corresponding quantization step size. The compression model may encode the target content based on the corresponding quantization step size, quantize the encoded target content, apply a bottleneck to the quantized target content to generate decodable target content, and decode the decodable target content to generate compressed target content. In some embodiments, the bottleneck may apply the corresponding quantization step size to the quantized target content.

Figure 7:
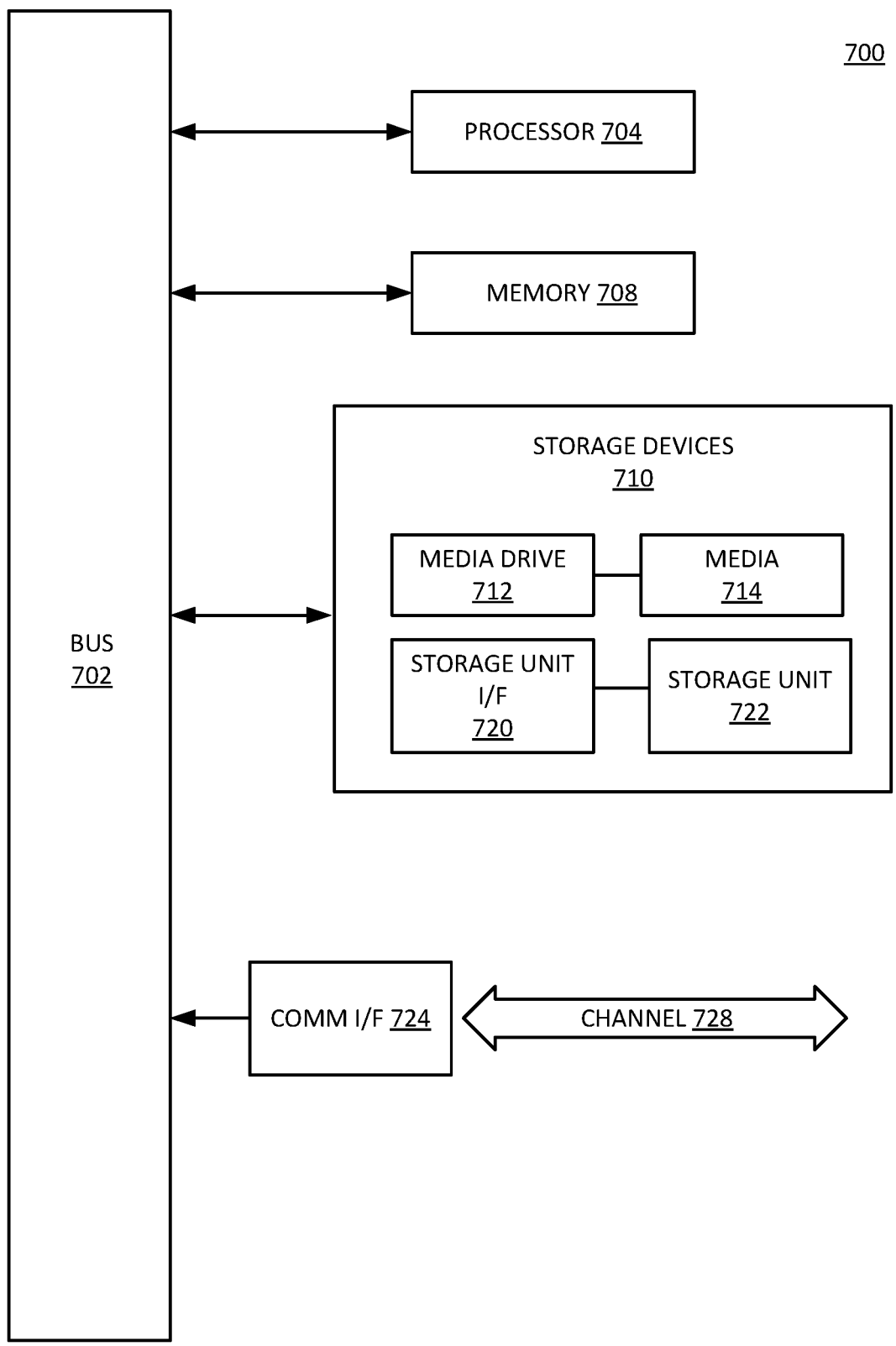
FIG. 7 illustrates an example computing component that may be used to implement features of various embodiments of the disclosure.

As used herein, the term component might describe a given unit of functionality that can be performed in accordance with one or more embodiments of the technology disclosed herein. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. In implementation, the various components described herein might be implemented as discrete components or the functions and features described can be shared in part or in total among one or more components. In other words, as would be apparent to one of ordinary skill in the art after reading this description, the various features and functionality described herein may be implemented in any given application and can be implemented in one or more separate or shared components in various combinations and permutations. As used herein, the term engine may describe a collection of components configured to perform one or more specific tasks. Even though various features or elements of functionality may be individually described or claimed as separate components or engines, one of ordinary skill in the art will understand that these features and functionality can be shared among one or more common software and hardware elements, and such description shall not require or imply that separate hardware or software components are used to implement such features or functionality.

Where engines and/or components of the technology are implemented in whole or in part using software, in one embodiment, these software elements can be implemented to operate with a computing or processing component capable of carrying out the functionality described with respect thereto. One such example computing component is shown in FIG. 7. Various embodiments are described in terms of this example-computing component 700. After reading this description, it will become apparent to a person skilled in the relevant art how to implement the technology using other computing components or architectures.

Referring now to FIG. 7, computing component 700 may represent, for example, computing or processing capabilities found within desktop, laptop, and notebook computers; hand-held computing devices (PDA's, smart phones, cell phones, palmtops, etc.); mainframes, supercomputers, workstations, or servers; or any other type of special-purpose or general-purpose computing devices as may be desirable or appropriate for a given application or environment. Computing component 700 might also represent computing capabilities embedded within or otherwise available to a given device. For example, a computing component might be found in other electronic devices such as, for example, digital cameras, navigation systems, cellular telephones, portable computing devices, modems, routers, WAPs, terminals and other electronic devices that might include some form of processing capability.

Computing component 700 might include, for example, one or more processors, controllers, control components, or other processing devices, such as a processor 704. Processor 704 might be implemented using a general-purpose or special-purpose processing engine such as, for example, a physical computer processor, microprocessor, controller, or other control logic. In the illustrated example, processor 704 is connected to a bus 702, although any communication medium can be used to facilitate interaction with other components of computing component 700 or to communicate externally.

Computing component 700 might also include one or more memory components, simply referred to herein as main memory 708. For example, preferably random access memory (RAM) or other dynamic memory might be used for storing information and instructions to be executed by processor 704. Main memory 708 might also be used for storing temporary variables or other intermediate information during execution of instructions to be executed by processor 704. Computing component 700 might likewise include a read-only memory ("ROM") or other static storage device coupled to bus 702 for storing static information and instructions for processor 704.

The computing component 700 might also include one or more various forms of information storage device 710, which might include, for example, a media drive 712 and a storage unit interface 720. The media drive 712 might include a drive or other mechanism to support fixed or removable storage media 714. For example, a hard disk drive, a floppy disk drive, a magnetic tape drive, an optical disk drive, a CD or DVD drive (R or RW), or other removable or fixed media drive might be provided. Accordingly, storage media 714 might include, for example, non-transient electronic storage, a hard disk, a floppy disk, magnetic tape, cartridge, optical disk, a CD or DVD, or other fixed or removable medium that is read by, written to, or accessed by media drive 712. As these examples illustrate, the storage media 714 can include a computer usable storage medium having stored therein computer software or data.

In alternative embodiments, information storage mechanism 710 might include other similar instrumentalities for allowing computer programs or other instructions or data to be loaded into computing component 700. Such instrumentalities might include, for example, a fixed or removable storage unit 722 and an interface 720. Examples of such storage units 722 and interfaces 720 can include a program cartridge and cartridge interface, a removable memory (for example, a flash memory or other removable memory component) and memory slot, a PCMCIA slot and card, and other fixed or removable storage units 722 and interfaces 720 that allow software and data to be transferred from the storage unit 722 to computing component 700.

Computing component 700 might also include a communications interface 724. Communications interface 724 might be used to allow software and data to be transferred between computing component 700 and external devices. Examples of communications interface 724 might include a modem or softmodem, a network interface (such as an Ethernet, network interface card, WiMedia, IEEE 802.XX, or other interface), a communications port (such as for example, a USB port, IR port, RS232 port, Bluetooth® interface, or other port), or other communications interface. Software and data transferred via communications interface 724 might typically be carried on signals, which can be electronic, electromagnetic (which includes optical), or other signals capable of being exchanged by a given communications interface 724. These signals might be provided to communications interface 724 via channel 728. This channel 728 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 708, storage unit 720, media 714, and channel 728. These and other various forms of computer program media or computer usable media may be involved in carrying one or more sequences of one or more instructions to a processing device for execution. Such instructions embodied on the medium are generally referred to as "computer program code" or a "computer program product" (which may be grouped in the form of computer programs or other groupings). When executed, such instructions might enable the computing component 700 to perform features or functions of the disclosed technology as discussed herein.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning, and configurations can be implemented to implement the desired features of the technology disclosed herein. Also, a multitude of different constituent component names other than those depicted herein can be applied to the various partitions. Additionally, with regard to flow diagrams, operational descriptions, and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to," or other like phrases in some instances shall not be read to mean that the narrower case is intended or required in instances where such broadening phrases may be absent. The use of the term "component" does not imply that the components or functionality described or claimed as part of the component are all configured in a common package. Indeed, any or all of the various components of a component, whether control logic or other components, can be combined in a single package or separately maintained and can further be distributed in multiple groupings or packages or across multiple locations.

Additionally, the various embodiments set forth herein are described in terms of exemplary block diagrams, flow charts, and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A computer-implemented method for encoding target content, the method being implemented in a computer system that comprises a non-transient electronic storage and one or more physical computer processors, comprising:
    obtaining, from the non-transient electronic storage, target content and a corresponding quantization step size;
    obtaining, from the non-transient electronic storage, a trained compression model, the trained compression model conditioned by training an initial compression model using training data, wherein the training data comprises (i) a set of training content, (ii) for each training content included in the set of training content, a plurality of quantization step sizes for quantizing the training content, and (iii) for each training content included in the set of training content, a plurality of reconstruction losses based on differences between the training content and a corresponding quantized training content that was quantized using a given quantization step size included in the plurality of quantization step sizes; and
    applying, with the one or more physical computer processors, the trained compression model to the target content to generate compressed target content.

2. The computer-implemented method of claim 1, wherein applying the trained compression model comprises:
    encoding, with the one or more physical computer processors, the target content to generate encoded target content;
    quantizing, with the one or more physical computer processors, the encoded target content using the corresponding quantization step size to generate quantized target content;
    applying, with the one or more physical computer processors, a bottleneck to the quantized target content to generate decodable target content; and
    decoding, with the one or more physical computer processors, the decodable target content to generate the compressed target content.

3. The computer-implemented method of claim 2, wherein applying the bottleneck to the quantized target content comprises modifying the quantized target content such that $$\tilde{y} = y + U\left(-\frac{1}{2}, \frac{1}{2}\right) \cdot s$$

where $\tilde{y}$ represents the decodable target content, $y$ represents the quantized target content, $U$ represents uniform noise, and $s$ represents the corresponding quantization step size.

4. The computer-implemented method of claim 1, wherein training the initial compression model comprises:
    a) applying, with the one or more physical computer processors, a first subset of the set of training content using a first quantization step size,
    b) applying, with the one or more physical computer processors, a second subset of the set of training content using the first quantization step size and a second quantization step size;
    c) repeating, with the one or more physical computer processors, b) by adding additional quantization step sizes until a maximum quantization step size is reached.

5. The computer-implemented method of claim 1, wherein the corresponding quantization step size is concatenated with the target content in order to apply the trained compression model.

6. The computer-implemented method of claim 1, wherein the target content comprises one or more of an image, a video frame, or a residual corresponding to the target content.

7. The computer-implemented method of claim 2, wherein quantizing the encoded target content is defined by $$Q(y, x) = \left(\frac{y}{s}\right)$$

where y represents the encoded target content, s represents the corresponding quantization step size, and round(•) represents a rounding function that maps values to a closest integer.

8. The computer-implemented method of claim 1, wherein the reconstruction losses are defined by $$\mathcal{L}(x,x') = \mathcal{R}(x,x') + \gamma \cdot \varepsilon(\tilde{y})$$

where $\mathcal{L}(\bullet,\bullet)$ (represents a rate-distortion loss value, $\mathcal{R}(\bullet, \bullet)$ represents a reconstruction loss value based on given target content and corresponding quantized target content, γ represents a weight, ε(•) represents an entropy value, and represents the quantized target content.

9. A computer-implemented method for training a compression model that improves quantization of target content, the method being implemented in a computer system, the computer system including one or more physical computer processors and a non-transitory electronic storage, comprising:

obtaining, from the non-transient electronic storage, training data, the training data comprising (i) a set of training content, (ii) for each training content included in the set of training content, a plurality of quantization step sizes for quantizing the training content, and (iii) for each training content included in the set of training content, a plurality of reconstruction losses based on differences between the training content and a corresponding quantized training content that was quantized using a given quantization step size included in the plurality of quantization step sizes;

obtaining, from the non-transient electronic storage, an initial compression model;

generating a trained compression model by training, on the one or more physical computer processors using the training data, the initial compression model; and storing, in the non-transient electronic storage, the trained compression model.

10. The computer-implemented method of claim 9, further comprising:

obtaining, from the non-transient electronic storage, target content and a corresponding quantization step size; and applying, with the one or more physical computer processors, the trained compression model to the target content and the corresponding quantization step size to generate compressed target content.

11. The computer-implemented method of claim 10, wherein applying the trained compression model comprises:

encoding, with the one or more physical computer processors, the target content to generate encoded target content;

quantizing, with the one or more physical computer processors, the encoded target content using the corresponding quantization step size to generate quantized target content;

applying, with the one or more physical computer processors, a bottleneck to the quantized target content to generate decodable target content; and decoding, with the one or more physical computer processors, the decodable target content to generate the compressed target content.

12. The computer-implemented method of claim 10, further comprising:

encoding, with the one or more physical computer processors, a residual corresponding to the target content.

* * * * *

UNITED STATES PATENT AND TRADEMARK OFFICE
CERTIFICATE OF CORRECTION

PATENT NO. : 11,335,034 B2
APPLICATION NO. : 16/249861
DATED : May 17, 2022
INVENTOR(S) : Christopher Schroers et al.

It is certified that error appears in the above-identified patent and that said Letters Patent is hereby corrected as shown below:

In the Claims

Column 19, Claim 7, Line 5, please delete " $Q(y, x) = \left(\frac{y}{s}\right)$ " and insert -- $Q(y, x) = \text{round}\left(\frac{y}{s}\right)$ --;

Column 19, Claim 8, Line 15, please delete "$\mathcal{L}(\cdot,\cdot(\text{represents}$" and insert -- $\mathcal{L}(\cdot,\cdot)$ represents --;

Column 19, Claim 8, Line 20, please insert -- $\tilde{y}$ -- after and.

Signed and Sealed this
Fifth Day of July, 2022

Katherine Kelly Vidal
*Director of the United States Patent and Trademark Office*